(12) United States Patent
Yamamoto

(10) Patent No.: US 6,844,995 B2
(45) Date of Patent: Jan. 18, 2005

(54) HEAD PROTECTION DEVICE AND A CARD READER HAVING THE HEAD PROTECTION DEVICE

(75) Inventor: Hisashi Yamamoto, Nagano (JP)

(73) Assignee: Sankyo Seiki Mfg. Co., Ltd., Suwa-gun (JP)

(*) Notice: Subject to any disclaimer, the term of this patent is extended or adjusted under 35 U.S.C. 154(b) by 298 days.

(21) Appl. No.: 10/185,437

(22) Filed: Jun. 26, 2002

(65) Prior Publication Data

US 2003/0030935 A1 Feb. 13, 2003

(30) Foreign Application Priority Data

Jun. 29, 2001 (JP) ........................................ 2001-197803

(51) Int. Cl.⁷ ............................................. G11B 25/04
(52) U.S. Cl. ........................ 360/2; 360/61; 360/63; 360/66; 360/68
(58) Field of Search .............................. 360/2, 61, 63, 360/66, 46, 67, 68; 235/449

(56) References Cited

U.S. PATENT DOCUMENTS 6,141,161 A * 10/2000 Sato et al. ...................... 360/2
6,574,058 B1 * 6/2003 Aruga et al. .................... 360/2

* cited by examiner

Primary Examiner—Alan T. Faber

(57) ABSTRACT

A head protection device in a data recording circuit is disclosed in which write-current of a given level that corresponds to a high or low level of coercive force of the magnetic recording portion of a recording medium is provided as an output and supplied to a magnetic head for data recording and reproduction. The data recording circuit comprises an alternate write-current supply portion for alternately providing, by a suitable current switching means, a low write-current corresponding to a low coercivity magnetic head and a high write-current corresponding to a high coercivity magnetic head, a common output portion for providing data to be recorded using a low current or a high current from the alternate write-current supply portion. The low coercivity magnetic head and the high coercivity magnetic head can be at least electrically switched. A current protection portion for a current switching means is provided so as to prevent generation of high write-current at the alternate write-current supply portion.

5 Claims, 3 Drawing Sheets

HEAD PROTECTION DEVICE AND A CARD READER HAVING THE HEAD PROTECTION DEVICE

BACKGROUND OF THE INVENTION a) Field of the Invention

The present invention relates to a head protection device in a data recording circuit in which write-current is supplied to a magnetic head, which acts on a data storage section of a data storage medium, and a card reader having the head protection device.

b) Description of the Related Art

Generally, magnetic data on magnetic strips or the like] that represent a magnetic recording section formed on a data storage media (e.g. magnetic card), are recorded and reproduced utilizing a magnetic head. Lately, two types of coercivity levels, a high end and a low end, have been standardized for use in a magnetic recording section. For example, in the area of magnetic cards, in addition to conventional low-coercivity cards (300 Oe, 650 Oe) under JIS (Japanese Industrial Standards) or ISO (International Standardization Organization), high coercivity cards (2500–4200 Oe) have been newly standardized. Herein, the use of a high coercivity magnetic recording section is advantageous from the standpoint of protection of magnetic data recorded in a magnetic recording section. However, it has the drawback that a device equipped with a magnetic head that reads or writes a high coercivity magnetic recording section (hereinafter referred to as "a high coercivity magnetic head") must be readily available. In addition, the magnetic head that reads or writes low coercivity (hereinafter referred to as "a low coercivity magnetic head") requires a circuit different from that used for a high coercivity magnetic head, therefore, separate devices, one for low coercivity and the other for high coercivity, must be prepared for alternate use.

To solve the problem presented in prior art, the inventor of the present invention developed a data recording circuit, where write-current is supplied to a magnetic head that alternately generates write-current that corresponds to each of the low and the high coercivity magnetic heads. Note that the data recording circuit is not known to the public at the time of filing this patent application.

More specifically the data recording circuit, that can accommodate both a low coercivity magnetic head and a high coercivity magnetic head operates in the following manner. FIG. 3, for example, illustrates that alternate write-current supply portion 2 is provided on the output side of CPU 1, where two types of write-currents are alternately output. Either a low write-current (Lo-Co Current) or a high write-current (Hi-Co current) from low voltage source 2a and high voltage source 2b respectively, flows into common output portion 3. Common output portion 3 is provided by CPU 11 with recording data signal S1 and recording gate signal S2 such that a low coercivity magnetic head 4 or high coercivity magnetic head 5 obtain each S1 and S2 by means of the above-mentioned Lo-Co current or Hi-Co current.

Herein, a low coercivity magnetic head 4 and a high coercivity magnetic head 5 can be alternately attached to or removed from common output portion 3. Both the low coercivity magnetic head and the high coercivity magnetic head can be alternately used in a single device, thereby reducing capital cost and providing an easy-to-use feature.

Nonetheless, the concept of one device having both a low coercivity magnetic head and a high coercivity magnetic head in an interchangeable manner has the drawback in that erroneous recognition occurs of whether it is a high coercivity magnetic head or a low coercivity magnetic head that is connected thereto. Particularly, when a low coercivity magnetic head is connected to the device, the circuit can be erroneously set up for Hi-Co current for a high coercivity magnetic head. Even if the setting is correct, there is concern about errors on the circuit side or the CPU that they might allow an excessive amount of current to flow into the low coercivity magnetic head, damaging the head or circuit.

OBJECT AND SUMMARY OF THE INVENTION

The present invention, as its primary object, provides a head protection device of a simple configuration that can prevent heads or circuitry from damage and a card reader having the head protection device.

To accomplish the above-mentioned objective, a head protection device is provided wherein the data recording circuit comprises: an alternate write-current supply portion for alternately providing, by a suitable current switching means, a Lo-Co current corresponding to a low coercivity magnetic head and a Hi-Co current corresponding to a high coercivity magnetic head; a common output portion for outputting data to be recorded using the Lo-Co current or the Hi-Co current from the alternate write-current supply portion, wherein the low coercivity magnetic head and the high coercivity magnetic head can be at least electrically switched, and a current protection portion for current switching means is provided so as to prevent generation of Hi-Co current at the alternate write-current supply portion.

In other words, according to the head protection device having the above-mentioned configuration, a write-current path for supplying write-current to either the low coercivity magnetic head or the high coercivity magnetic head, is configured in one data recording circuit. As a result, a low coercivity magnetic head or a high coercivity magnetic head can be alternately selected for use in a single device. In addition, the current protection portion provided in the data-recording path prevents a low coercivity magnetic head from excessive flow of write-current.

A card reader having the head protection device is also provided wherein the data recording circuit comprises: a suitable write-current supply portion for alternately providing, by an arbitrary current switching means, a Lo-Co current corresponding to a low coercivity magnetic head and a Hi-Co current corresponding to a high coercivity magnetic head; and a common output portion for outputting data to be recorded using a low current or a Hi-Co current from the alternate write-current supply portion, wherein the low coercivity magnetic head and the high coercivity magnetic head can be at least electrically switched, and a current protection portion for the current switching means is provided so as to prevent generation of Hi-Co current at the alternate write-current supply portion.

In other words, according to the head protection device having a head protection device having the above-mentioned configuration, a write-current path for supplying write-current to the low coercivity magnetic head and the high coercivity magnetic head, is configured in one data recording circuit. As a result, a low coercivity magnetic head and a high coercivity magnetic head can be alternately selected for use in a single device. In addition, the current protection portion provided in the data-recording path prevents a low coercivity magnetic head from excessive flow of write-current.

In the head protection device or a card reader having the head protection device, furthermore, a high coercivity magnetic head can mechanically be attached to or removed from the common output portion via the connection board having a given resistivity, and at the same time, a board connection detection means is provided both on the current protection portion and the connection board so as to sense whether the connection board is connected to the current protection portion side.

According to the head protection device and a card reader having the head protection device, only by mechanically attaching to or removing from the high coercivity magnetic head, one can let the data recording side recognize whether the high coercivity head is attached or connected to the common output portion via a connection board. This is a simple configuration but provides an easy-to-handle feature.

Moreover, in the head protection device or a card reader having the head protection device, the current switching means of the current protection portion switches, upon reception of a confirmation signal from the connection board side, such that a Hi-Co current is generated in the alternate write-current supply portion.

According to the head protection device and a card reader having the head protection device, the current switching means in the current protection portion is automatically (electrically) actuated.

The head protection device or a card reader having the head protection device, wherein the switching means is configured in an electrical circuit or control software, therefore, it can be configured in many different ways.

DESCRIPTION OF THE PREFERRED EMBODIMENTS

Embodiments of the present invention are described in detail herein with reference to the drawings.

Figure 1:
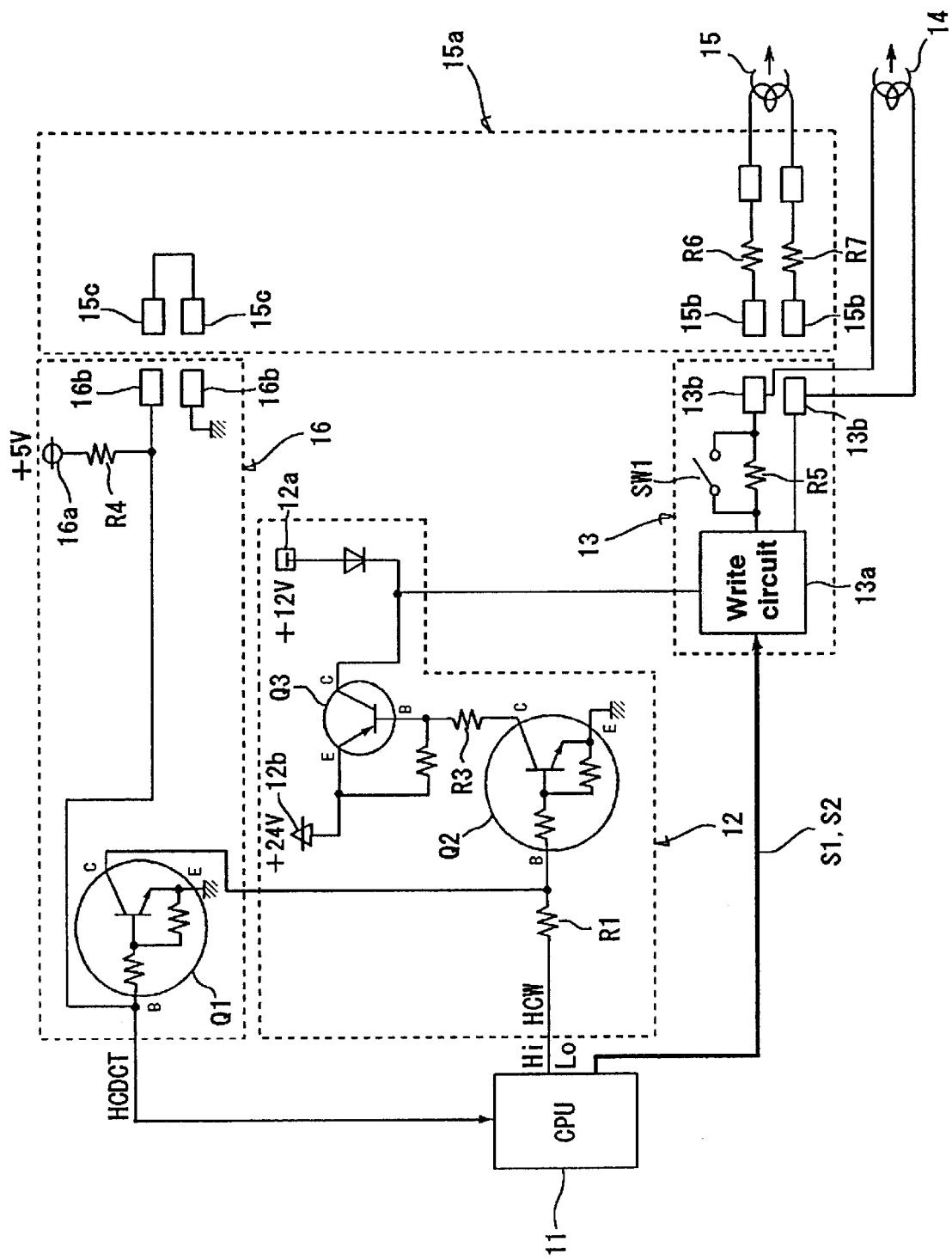
FIG. 1 is a block diagram showing the circuit of the head protection device of a card reader according to Embodiment 1 of the present invention.
Figure 2:
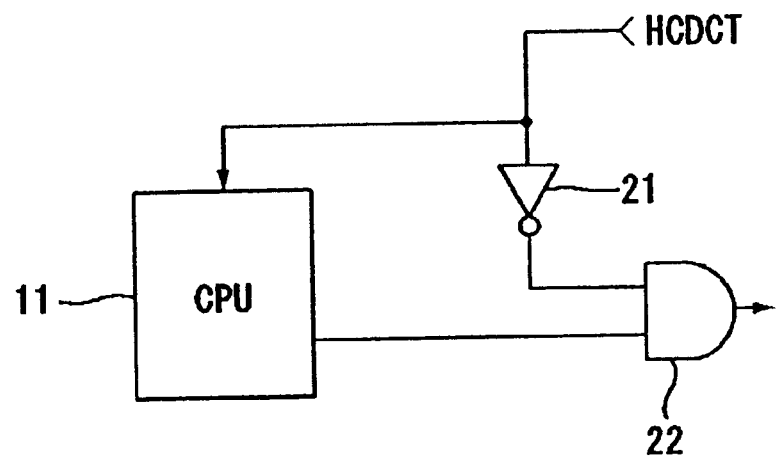
FIG. 2 is a block diagram of a circuit of an alternate embodiment of the present invention.
Figure 3:
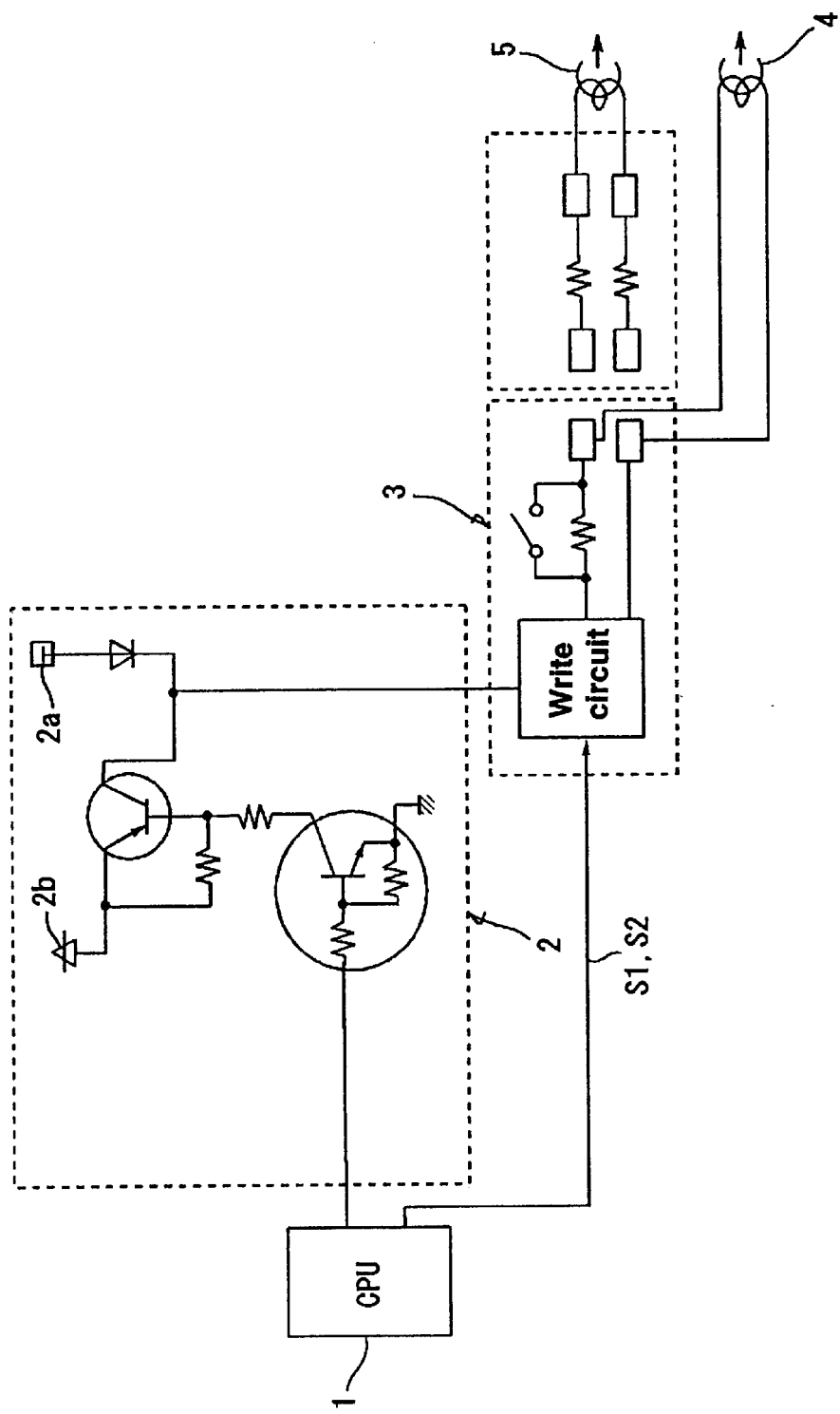
FIG. 3 is a block diagram showing a circuit of the head protection device adopted in a general card reader.

First, FIG. 1 shows an embodiment of the head protection device in a card reader, which is one of the back-end devices in the automated teller machine (not illustrated), the front-end device. Each of the operations performed in the card reader as a back-end device, is controlled based on commands coming from the body of the automated teller machine, the front-end device, so as to interrelate operations between the two systems.

In other words, a recording command signal is sent as required from the body of the automated teller machine, the upper device, to CPU 11 provided in the data recording circuit of the card reader. Based on the recording command signal, an output command signal (HCW signal) for commanding output of write-current that corresponds to the magnetic strip (magnetic recording portion) of a magnetic card currently in use is sent from CPU 11 to alternate write-current supply portion 12. The output command signal (HCW signal) commands comprises a "Lo-signal" for commanding output of a Lo-Co current corresponding to a low coercivity magnetic strip and a "Hi-signal" for commanding output of a Hi-Co current for commanding output of the Hi-Co current corresponding to a high coersivity magnetic strip.

In current alternate supply portion 12 is provided low voltage (+12V) power supply 12a and high voltage (+24V), wherein the supply current path is switched in response to an output command from CPU 11 to either the low voltage source 12a side or the high voltage source 12b side such that either the Lo-Co current or the Hi-Co current is selectively supplied to common output portion 13 in the manner described below.

More specifically, if the output command signal (HCW signal) sent from CPU 11 to alternate write-current supply portion 12 is the "Lo-signal", the base side of the transistor Q2, a current switching means, becomes the Lo level (mode) and puts the transistor Q2 in the "OFF" state. As a result, the base side of transistor Q3, connected to the collector side of transistor Q2 to provide current switching means, enters the Hi level mode, putting transistor Q3 in the "OFF" state. As a result of this, the supply current path connected to the collector side of transistor Q3 is switched to the side where low voltage source 12a is located. The above-mentioned Lo-Co current is thus supplied from low voltage source 12a to common output portion 13.

In contrast, the output command signal (HCW signal) coming from CPU 11 to alternate write-current supply portion 12 puts the base side of transistor Q2 in the Hi level (mode), resulting in putting transistor Q2 in the "ON" state. In turn, the base side of transistor Q3 is switched to the Lo level (mode), turning transistor Q3 on. The current path is thus switched to the high voltage source 12b side wherein the high voltage source 12b is connected to the emitter side of transistor Q3. The Hi-Co current is thus supplied from high voltage source 12b to common output portion 13.

Write circuit 13a is provided in common output portion 13, and recording data signal S1 and recording gate signal S2 from CPU 11 are input into write circuit 13a. S1 or S2 are supplied to low coercivity magnetic head 14 and high coercivity magnetic head 15 utilizing a Lo-Co current or Hi-Co current, whichever is selected, that is further supplied to write circuit 13a.

Herein, low coersivity magnetic head 14 is configured such that the a low coercivity magnetic head can be electrically turned "ON" or "OFF" by directly attaching to or removing from a pair of output connector terminals 13b in common output portion 13; the high coercivity magnetic head 15 is electrically turned "ON" or "OFF" by attaching to or removing from output connector terminal 13b via connection board 15a.

Now, when low coercivity magnetic head 14 is attached to common output portion 13, output from write circuit 13a is supplied thereto via resistor R5; when high coercivity magnetic head 15 is attached to common output 13, closure of switch SW1, arranged in parallel with resister R, supplies output from write circuit 13a along the switch SW1 side without passing resister R5.

Moreover, a pair of input connector terminals 15b to be connected to a pair of output connectors 13b in common output portion 13, is provided on connection board 15a, where low coercivity magnetic head 14 or high coercivity magnetic head 15 is alternately connected as required.

Also, low coercivity magnetic head 14 and its current protection portion 16, for protecting the circuit that contact low coercivity magnetic head 14, are attached to alternate write-current supply portion 12. In other words, current protection portion 16 is designed such that output from constant voltage (+5V) source 16a through resistor R4 puts the base side of transistor Q1 in the Hi level mode, thereby maintaining transistor Q1 in the "ON" state. The collector side of transistor Q1, being maintained in the "ON" state, is connected to the base side of transistor Q2, which is the current switching means for alternate write-current supply portion 12, thereby maintaining the base side of transistor Q2 in the Low level mode all the time, maintaining transistor Q2 in the "OFF" state.

When transistor Q2 is turned off, a Lo-Co current is output from common output portion 13, as described above. Therefore, even if there is a concern that Hi-Co current is output due to erroneous operation of the circuit or for some other reasons, Hi-Co current will not be outputted from common output portion 13 as long as low coercivity magnetic head 14 is attached to common output portion 13. Lo-Co current is thus outputted all the time.

A pair of switch-connectors 15c, that are electrically connected to each other, is provided on connection board 15a of high coercivity magnetic head 15 so as to constitute board connection detection means (on one side), at the same time, a pair of connection detector connectors 16b is provided in current protection portion 16 corresponding to a pair of switch-connectors 15c so as to constitute board connection means on the other side. One side (upward direction in FIG. 1) is connected to the constant voltage source 16a side while the other (downward direction in FIG. 1) connectors 16b are grounded.

Therefore, when connection board 15a of high coercivity magnetic head 15 is connected to common output portion 13, switch connectors 15c on the connection board 15a side is connected to connection detection connector 16b on the current protection portion 16 side. By this, the current level drops to a Lo-level (mode) on the base side of transistor Q1, when connection of high coercivity magnetic head 15 is detected. As connection of high coercivity magnetic head 15 is detected, transistor Q1 is turned off; the base side of transistor Q2, constituting the current switch means of alternate write-current supply portion 12 and being connected to the collector side of transistor Q1, is switched to the Hi-level (mode), turning on transistor Q2. As a result, Hi-Co current is output from common output portion 13 as described above.

Usually, the HCDCT signal (a high coercivity magnetic head detection signal) of Lo-level (mode) is detected when high coercivity magnetic head 15 is connected to common output portion 13. In this embodiment, the HCDCT signal is also inputted into the above-mentioned CPU 11. The software controls operation in such a way that Hi-Co current is outputted only when CPU 11 receives the HCDCT signal of Lo-level (mode). As long as high coercivity magnetic head 15 is not connected to common output portion 13, the HCDCT signal is not received, therefore CPU 11 does not let Hi-Co current flow.

According to the head protection device in a card reader of this embodiment having the configuration described above, a write-current path, that supplies different levels of write-current to the low coercivity magnetic head 14 and high coercivity magnetic head 15, is configured in a single data-recording path. This makes it possible to alternately use low coercivity magnetic head 14 and high coercivity magnetic head 15 in a single device.

In addition, taking advantage of current protection portion 16 attached to alternate write-current supply portion 12 of the data recording circuit, excessive write-current does not flow into low coercivity magnetic head 14, and low coercivity magnetic head 14 and its circuitry are protected from exposure to excessive current.

Moreover, according to this embodiment, connection of the high coercivity magnetic head 15, instead of low coercivity magnetic head 14, allows output of Hi-Co current. Only mechanical attachment or removal can switch the data-recording path to serve a high coercivity magnetic head to common output portion 13. This is a simple configuration but can provide an easy-to-operate feature.

Also, in the above embodiments, current switching means in alternate write-current supply portion 12 is configured on hardware, and Hi-Co current output is controlled by software. This dual protection provides excellent reliability.

The inventor specifically described embodiments of the present invention above, however, the present invention is not limited to the above embodiments. The present invention may be modified in many different ways as long as the spirit of the invention is maintained.

For example, instead of transistor Q1 and R1, constituting current switching means of alternate write-current supply portion 12a, modified circuit configuration such as a combination of inverter IC 21 and AND gate IC 22 may be employed.

Further, the present invention is applied to a card reader in each embodiment described above, however, the present invention may be applied to other devices of various kinds in a similar manner.

As described above, in one form of the invention, the head protection device of the present invention and the card reader having the head protection device have an alternate write-current supply portion which selectively switches a high or low write-current to generate write-current for the low coercivity magnetic head or the high coercivity magnetic head. This configuration makes it possible for one device to alternately accommodate both a low coercivity magnetic head and a high coercivity magnetic head. In addition, the current protection portion in the data recording circuit prevents a low coercivity magnetic head from excessive write-current. An easy-to-use feature can be thus obtained cost effectively, and the simple configuration prevents heads or their circuitry from damage, thereby providing excellent usage and reliability.

The head protection device or a card reader having the head protection device has a magnetic head for high coercivity that can mechanically be attached to or removed from the common output portion via a connection board having a given resistivity, and at the same time, a board connection detection means is provided on both the current protection portion and the connection board so as to sense whether the connection board is connected on the current protection portion side. Only by mechanically attaching to or removing the high coercivity magnetic head, one can let the data recording side recognize whether the high coercivity head is attached or connected to the common output portion via a connection board. This is a simple configuration but provides an easy-to-handle feature.

Moreover, in a further aspect of the invention, in the head protection device or a card reader having the head protection device, the current switching means of current protection portion switches, upon reception of a confirmation signal from the connection board side, such that a Hi-Co current is generated in the alternate write-current supply portion. The current switching means in the current protection portion is thus actuated automatically (electrically), and the above-mentioned effects can be further enhanced.

The head protection device or a card reader having the head protection device, in yet another form of the invention, the switching means is configured in an electrical circuit or control software, the switching means can be constituted in many different ways. With this additional feature, the present invention can be simple and even more cost effective.

While the foregoing description and drawings represent the present invention, it will be obvious to those skilled in the art that various changes may be made therein without departing from the true spirit and scope of the present invention.

What is claimed is:

1. A head protection device in a data recording circuit in which write-current of a given level that corresponds to a high or low level of coercive force of the magnetic recording portion of a recording medium is provided as an output and supplied to a magnetic head for data recording and reproduction, the data recording circuit comprising:

an alternate write-current supply portion for alternately providing, by a suitable current switching means, a low write-current corresponding to a low coercivity magnetic head and a high write-current corresponding to a high coercivity magnetic head; and a common output portion for providing data to be recorded using a low current or a high current from the alternate write-current supply portion, wherein the low coercivity magnetic head and the high coercivity magnetic head can be at least electrically switched; and a current protection portion for a current switching means being provided so as to prevent generation of high write-current at the alternate write-current supply portion.

2. A card reader having a head protection device in a data recording circuit in which write-current of a given level that corresponds to a high or low level of coercive force of a magnetic recording portion on a magnetic tape is provided as an output and supplied to a magnetic head for data recording and reproduction, the data recording circuit comprising:

an alternate write-current supply portion for alternately providing, by a suitable current switching means, a low write-current corresponding to a low coercivity magnetic head and a high write-current corresponding to a high coercivity magnetic head;

a common output portion for providing data to be recorded using current or a high write-current provided by the alternate write-current supply portion, wherein the low coercivity magnetic head and the high coercivity magnetic head can be at least electrically switched, and a current protection portion for the current switching means is provided so as to prevent generation of high write-current at the alternate write-current supply portion.

3. A head protection device as set forth in claim 1 wherein the high coercivity magnetic head can be mechanically attached to or removed from the common output portion via a connection board having a given resistivity, wherein a board connection detection means is provided on both the current protection portion and said connection board so as to sense whether that the connection board is connected on the current protection portion side or not.

4. A current switching means, attached to the current protection portion, in a head protection device as set forth in claim 3 wherein the current switching portion of the current protection portion switches the circuit, upon reception of a confirmation signal from the connection board side, such that high write-current is generated in the alternate write-current supply portion.

5. The switching means in the head protection device as set forth in claim 3, wherein the switching means is configured in an electrical circuit or control software.

* * * * *